United States Patent
Fletcher et al.

(10) Patent No.: US 7,538,762 B2
(45) Date of Patent: May 26, 2009

(54) SWITCHING DISPLAY UPDATE PROPERTIES UPON DETECTING A POWER MANAGEMENT EVENT

(75) Inventors: Terry M. Fletcher, Rancho Cordova, CA (US); Edward P. Costales, West Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 10/677,146

(22) Filed: Sep. 30, 2003

(65) Prior Publication Data

US 2005/0068311 A1    Mar. 31, 2005

(51) Int. Cl.
*G09G 5/00* (2006.01)
(52) U.S. Cl. .................. 345/211; 345/212; 345/213; 713/310; 713/320
(58) Field of Classification Search ......... 345/211–213; 713/300–340
See application file for complete search history.

(56) References Cited

U.S. PATENT DOCUMENTS

| | | | | |
|---|---|---|---|---|
| 5,303,171 A * | 4/1994 | Belt et al. | ............... | 713/321 |
| 5,442,794 A * | 8/1995 | Wisor et al. | ............... | 713/340 |
| 5,524,249 A * | 6/1996 | Suboh | ............... | 713/322 |
| 5,548,765 A | 8/1996 | Tsunoda et al. | | |
| 5,860,016 A | 1/1999 | Nookala et al. | | |
| 5,991,883 A | 11/1999 | Atkinson | | |
| 6,005,559 A * | 12/1999 | Miyamoto | ............... | 345/212 |
| 6,029,249 A * | 2/2000 | Atkinson | ............... | 713/323 |
| 6,078,319 A * | 6/2000 | Bril et al. | ............... | 345/211 |
| 6,184,875 B1 * | 2/2001 | Matsuura | ............... | 345/211 |
| 6,310,618 B1 * | 10/2001 | Zhang et al. | ............... | 345/213 |
| 6,476,800 B2 * | 11/2002 | Millman et al. | ............... | 345/212 |
| 6,801,811 B2 * | 10/2004 | Ranganathan et al. | ............... | 700/22 |
| 7,035,155 B2 * | 4/2006 | Stimak et al. | ............... | 365/222 |
| 2002/0021275 A1 | 2/2002 | Kataoka et al. | | |
| 2002/0075251 A1 | 6/2002 | Millman et al. | | |
| 2002/0146911 A1 * | 10/2002 | Muranaka et al. | ............... | 438/745 |
| 2003/0131269 A1 * | 7/2003 | Mizyuabu et al. | ............... | 713/320 |
| 2003/0135288 A1 | 7/2003 | Ranganathan et al. | | |
| 2003/0201990 A1 * | 10/2003 | Aldrich et al. | ............... | 345/211 |
| 2003/0217297 A1 * | 11/2003 | Gschwind et al. | ............... | 713/300 |

FOREIGN PATENT DOCUMENTS

WO    WO-2005/033919 A2    4/2005

OTHER PUBLICATIONS

"International Search Report for corresponding PCT Application No. PCT/US2004/031908", 6 pgs.
"Powerplay™ White Paper", *ATI Technologies Inc.*, http://www.ati.com/products/pdf/powerplaywp2.pdf>, (Aug. 2001), 8 pgs.

* cited by examiner

*Primary Examiner*—Bipin Shalwala
*Assistant Examiner*—Vince E Kovalick
(74) *Attorney, Agent, or Firm*—Schwegman, Lundberg & Woessner, P.A.

(57) ABSTRACT

Systems and methods provide automatic switching of display update properties such as screen resolution, pixel depth, and refresh rate in response to a power management event. The display update property may be decreased when power is switched from AC power to DC power, for example, when the system is unplugged from a wall outlet and is running on battery power.

19 Claims, 4 Drawing Sheets

SWITCHING DISPLAY UPDATE PROPERTIES UPON DETECTING A POWER MANAGEMENT EVENT

FIELD

The present invention relates generally to computer devices, and more particularly to switching display update properties such as screen resolution, pixel depth and refresh rates on such devices upon detecting a power management event.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Intel Corporation. All Rights Reserved.

BACKGROUND

Mobile computing systems such as laptop computers, notebook computers, PDAs (Personal Digital Assistants) and the like are becoming more and more popular. A critical aspect of such systems is that they typically run using battery power when they are not or cannot be connected to an AC power source. As a result, mobile computers typically provide power management capabilities in order to run as long as possible off of battery power.

Various components on computing systems consume power. For example, a video display (typically an LCD on mobile computing systems) and memory associated with video display consume power. The video display must be continually refreshed, typically by a graphics engine on a graphics controller. The display is refreshed pixel by pixel, with the graphics engine fetching the pixel data from memory. The act of fetching data consumes power on the graphics engine (or controller), the memory subsystem containing the pixel data, and the display device itself. Typically the amount of power consumed is related to the refresh rate and the amount of memory required to support the video display. This in turn is related to the screen resolution. For example, a higher screen resolution will require more memory, and consequently more memory access resulting in more power consumption with each refresh than a lower resolution setting. Thus while high resolution screens on today's mobile computing devices provide increased image quality, they also consume more power resulting in potentially short battery life.

In view of the above, there is a need in the art for the present invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and software operating environment of different embodiments of the invention are described. In the second section methods according to various embodiments of the invention are described.

Operating Environment

Figure 1:
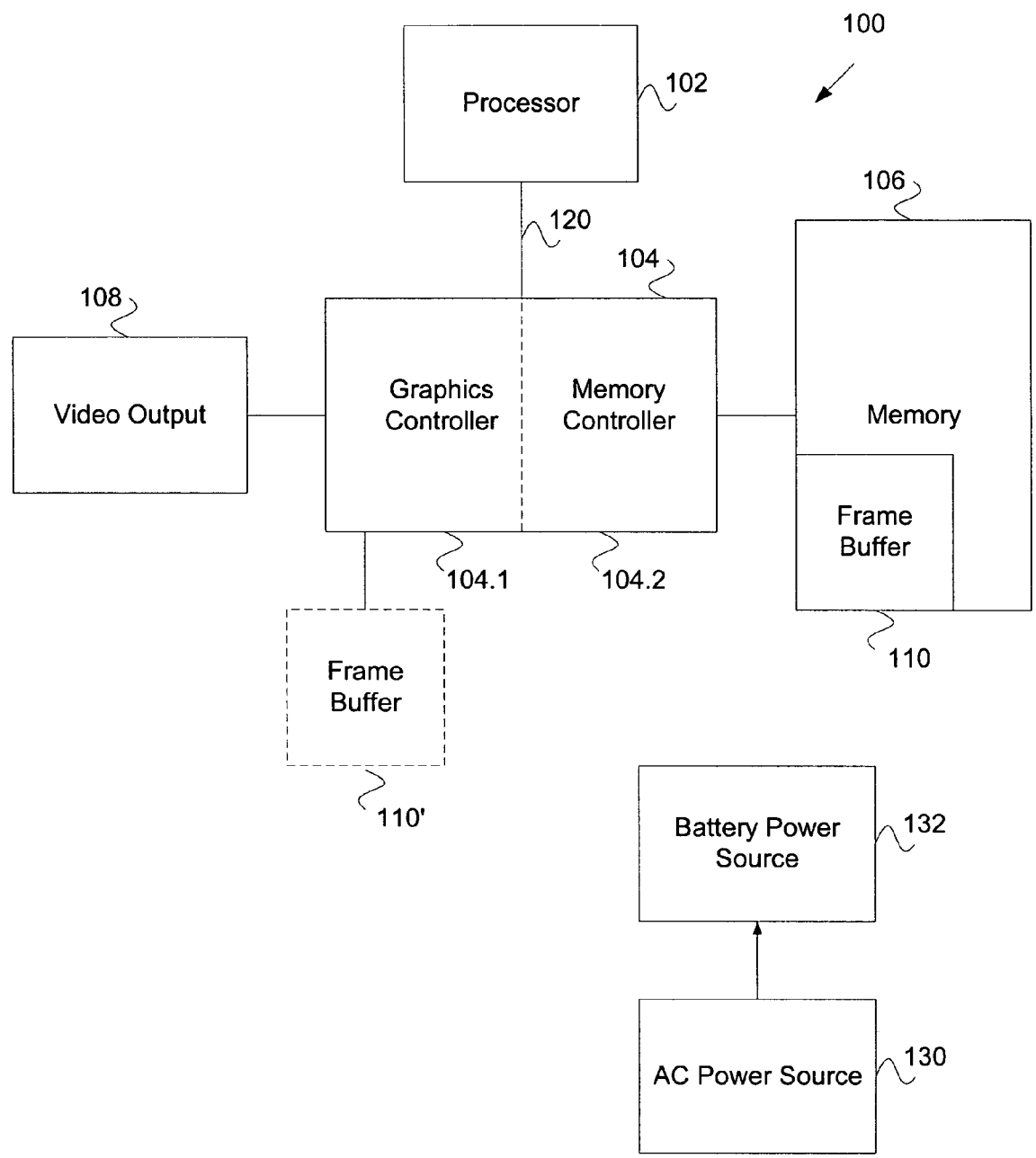
FIG. 1 is a block diagram illustrating an overview of a hardware environment incorporating embodiments of the invention.

FIG. 1 is a block diagram of the major components of a hardware environment 100 incorporating various embodiments of the invention. In general, the systems and methods of the various embodiments of the invention may be incorporated on any hardware system supporting multiple power sources, for example AC power source 130 and DC power source 132. Examples of such hardware includes laptop computers, portable handheld computers, personal digital assistants (PDAs), network enabled cellular telephones, and hybrids of the aforementioned devices. In some embodiments of the invention, hardware environment 100 comprises a processor 102, a graphics and memory controller 104, memory 106 and video output 108. Communications between the processor and integrated graphics and memory controller 104 occurs via processor system bus 120 in some embodiments of the invention. In particular embodiments, processor system bus 120 is a 400-MHz source-synchronous front side bus.

Processor 102 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 102 may be a processor in the Pentium® or Celeron® family of processors available from Intel Corporation, Santa Clara, Calif. Although only one processor 102 is shown, multiple processors may be connected to system bus 120.

Graphics and memory controller 104 may provide graphics and video functions and may interface one or more memory devices to the processor system bus 120. In some embodiments, graphics and memory controller 104 may be integrated on a single chip and may include graphics controller 104.1 and memory controller 104.2. In alternative embodiments, graphics controller 104.1 may reside on a separate chip or chipset from memory controller 104.2. In further alternative embodiments, graphics controller 104.1 may reside on a video controller card (not shown). Graphics controller 104.1 may include various graphics sub-portions such as a 3-dimensional (3D) engine, 2-dimensional (2D) engine, video engine, etc.

Graphics controller 104.1 may provide video output 108. Video output 108 may be an interface to an LCD (Liquid Crystal Display) that is integral to a mobile computing environment in which system 100 resides, or video output may be an interface to an external display. In some embodiments, the interface to the LCD may be a LVDS (Low Voltage Differential Signal) interface. Additionally, video output 108 may be a Digital Video Out Port (DVOB or DVOC) or a CRT interface such as a VGA interface.

Memory controller 104.2 may interface with a system memory 106. System memory 106 may be any type of volatile or non-volatile memory, including any type of RAM (Random Access Memory), ROM (Read-Only Memory), flash memory etc. In some embodiments, memory 106 may comprise DDR-SDRAM (Double Data Rate-Synchronous Dynamic Random Access Memory), a type of SDRAM that supports data transfers on both edges of each clock cycle (the rising and falling edges), effectively doubling the memory chip's data throughput. DDR-SDRAM typically consumes less power, which makes it well-suited to mobile computing environments.

In some embodiments, frame buffer 110 is part of system memory 106. Frame buffer 110 may be memory that stores pixel values for pixels on a monitor connected to video output 108, such as an integral LCD monitor. The amount of memory required for frame buffer 110 typically depends on the pixel depth (e.g. the number of bits used for each color), the screen width and the screen height. In alternative embodiments, frame buffer 110 may be a separate memory 110' from system memory 106. In further alternative embodiments, frame buffer 110 may reside on a graphics controller card.

Figure 2:
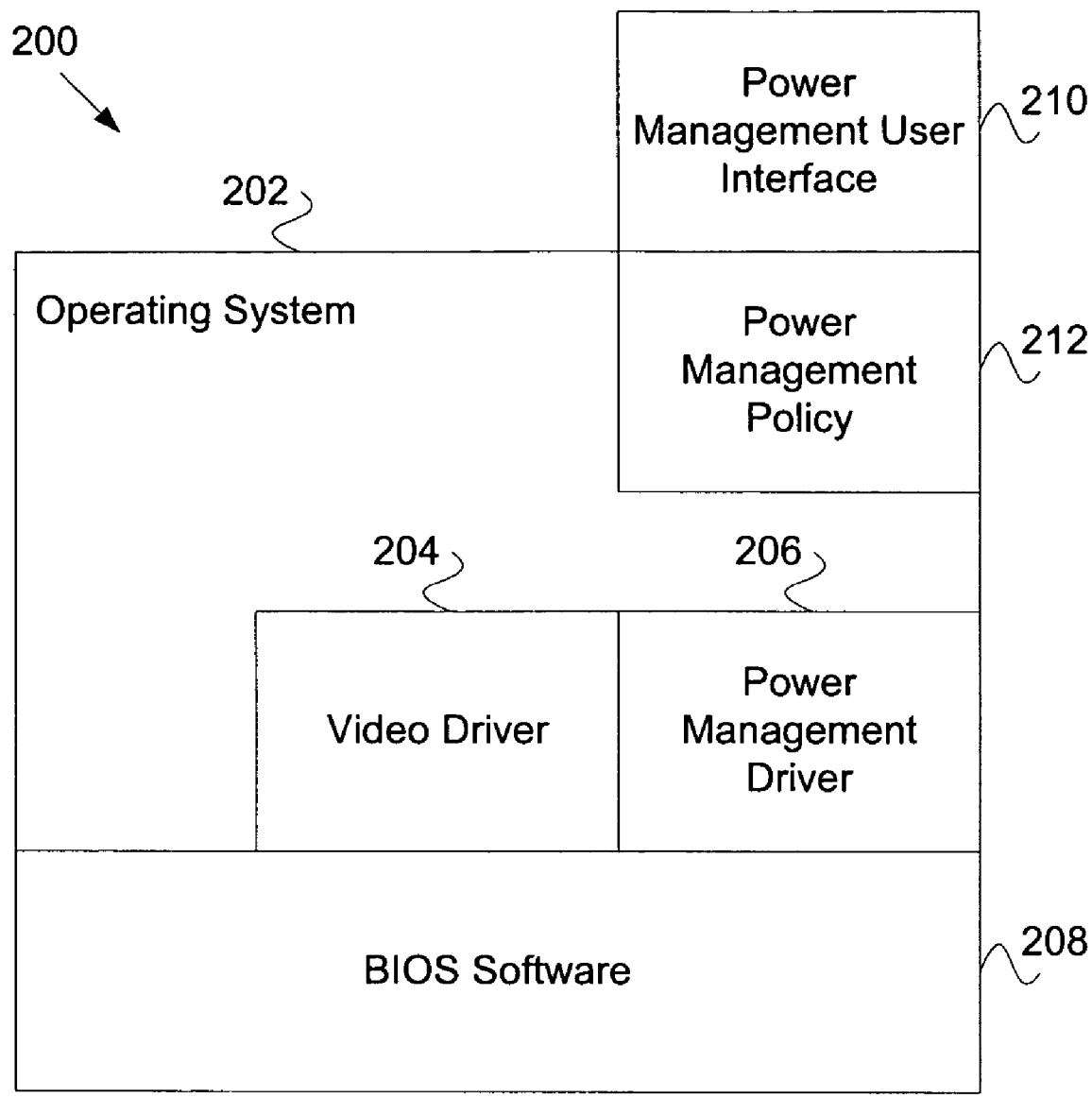
FIG. 2 is a block diagram providing details software environment incorporating embodiments of the invention.

FIG. 2 illustrates an exemplary software environment 200 according to various embodiments of the invention. In some embodiments, software environment 200 includes operating system 202, video driver 204, power management driver 206, BIOS (Basic Input/Output System) software 208, and power management user interface 210. Operating system 202 manages the execution of programs and tasks running on processor 102, and manages devices such as hard drives, floppy drives, CD-ROM drives, DVD-ROM drives, network interfaces and other devices. In some embodiments of the invention, operating system 202 may be one of the Microsoft Windows family of operating systems available from Microsoft Corporation of Redmond, Wash. These operating systems include Windows 95®, Windows 98®, Windows CE®, Windows NT®, Windows 2000®, Windows ME® and Windows XP®. Additionally, operating system 202 may be a UNIX operating system or a UNIX based operating system such as Linux® or FreeBSD. Alternatively, operating system 202 may be the Mac OS® operating system from Apple Computer Incorporated, Cupertino, Calif. No embodiment of the invention is limited to a particular operating system.

Video driver 204 provides an interface between software such as operating system 202 and applications controlled by operating system 202, and video hardware such as graphics and memory controller 104. Video driver 204 typically translates standard operating system video functions for operating system 202 into the specific commands required by the specific video hardware and/or firmware resident on computer system 100. These commands include commands that control the resolution setting, pixel depth setting and refresh rate for the video hardware.

In some embodiments, a power management driver 206 comprises software that interfaces with power management hardware and firmware on computer system 100. Examples of such functions include functions that detect whether the computer system is currently connected to an AC power source, functions that obtain the current state of a battery used to provide power and functions that detect the level of charge in the battery.

BIOS software 108 may reside in a separate memory from system memory 106, and comprises a set of functions that control basic aspects of hardware and hardware controllers that may be part of a computer system 100. BIOS software 108 may also include functions that control the resolution of a video device, and may also include functions related to power management, such as the functions described above with respect to power management driver 206.

While some embodiments include BIOS software 108, not all embodiments need include or utilize BIOS software 108, and in alternative embodiments the driver layer software such as video driver 204 and power management driver 206 interface directly with the hardware rather than through BIOS software 108.

Power management policies 212 comprise a set of one or more policies that define actions that take place upon the occurrence of power management events. These polices may comprise default actions, or they may be customized by a user through a power management user interface 210. In some embodiments of the invention, the power management policies include policies that define a screen resolution setting that is to be used upon the occurrence of particular power management events. In alternative embodiments of the invention, the power management policies include policies that define a pixel depth setting that is to be used upon the occurrence of particular power management events. In further alternative embodiments, the power management policies include policies that define a refresh rate setting that is to be used upon the occurrence of particular power management events. These power management events include switching the power source from AC (Alternating Current) to DC (Direct Current) and battery charge level events (e.g. a battery reaching a certain percentage of charge or battery time remaining). In some embodiments, power management user interface 210 may be provided as part of a "control panel" interface, and provide various user interface mechanisms (menus, buttons, icons etc.) for choosing and/or defining actions that are to take place upon power management events.

Methods

Figure 3A:
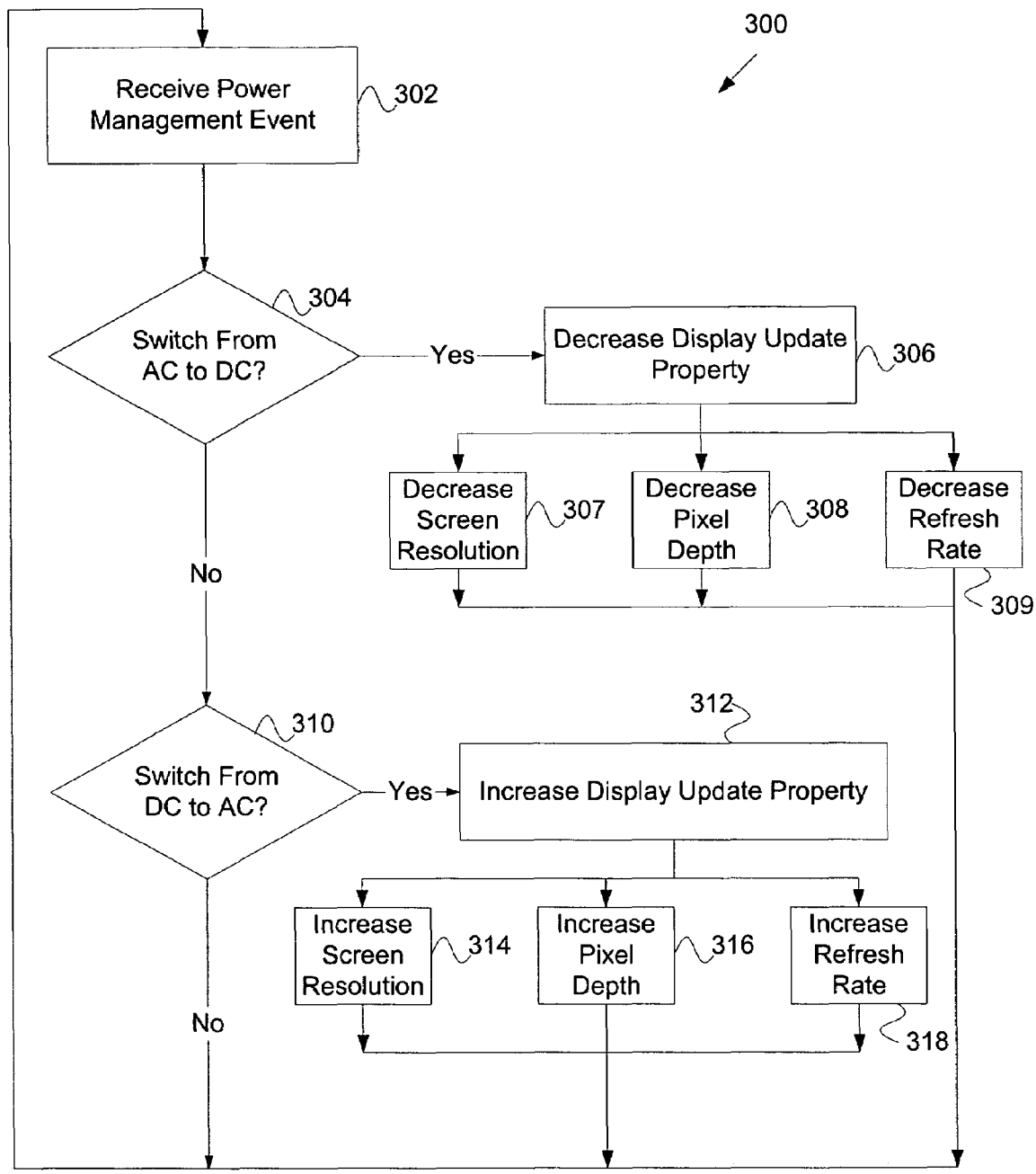
FIGS. 3A and 3B are flowcharts illustrating methods for dynamically switching screen resolution upon receiving a power management event according to embodiments of the invention.
Figure 3B:
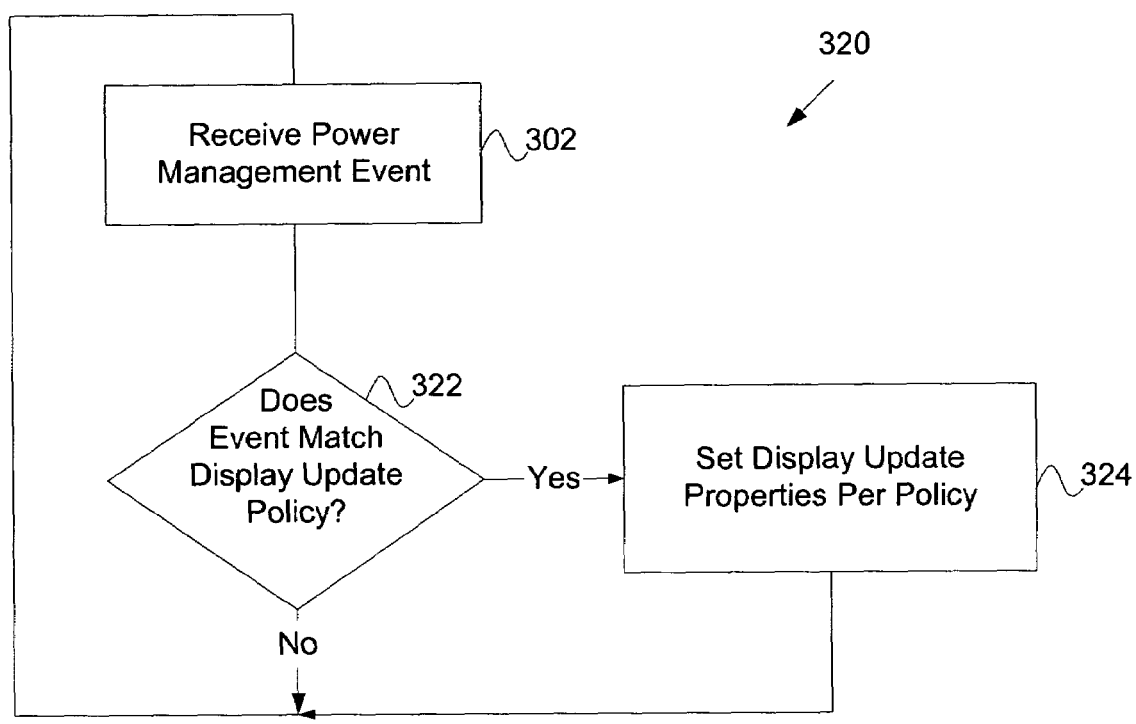

FIGS. 3A and 3B are flowcharts illustrating methods for automatically switching display update properties upon the occurrence of power management events according to embodiments of the invention. The methods may be performed within a hardware and software operating environment such as that described above with reference to FIGS. 1 and 2. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media such as RAM, ROM, CD-ROM, DVD-ROM, flash memory etc.). The methods illustrated in FIGS. 3A and 3B are inclusive of the acts performed by an operating environment executing an exemplary embodiment of the invention.

FIG. 3A illustrates a method 300 for dynamically switching display update properties based on power management events. For the purposes of this specification, display update properties include screen resolution settings, pixel depth (i.e. the number of bits per pixel—also referred to as color quality) and refresh rate settings. In some embodiments, the method begins when a system executing the method receives a power management event (block 302). In some embodiments, the event may indicate that a change has been made in the power source. For example, the event may indicate that the system is no longer connected to an AC power source, or the event may indicate that the system has been connected to an AC power source. In embodiments where the operating system is the Microsoft Windows based operating system, the event may be a "PBT_APMPOWERSTATUSCHANGE" event that is sent to one or more applications executing on the system.

A check is made to determine if a switch has been made from AC power to DC power, i.e. the system is now running on battery power (block 304). If so, the system may automatically decrease one or more display update properties (block 306). In some embodiments, the system decreases the screen resolution (block 307). In alternative embodiments, the system decreases the pixel depth (block 308). In further alternative embodiments, the system decreases the refresh rate (block 309). The various embodiments of the invention may execute any combination of one or more of blocks 307, 308 and 309. For example, if the screen resolution was set to a relatively high resolution, e.g. 1600×1200 or 1280×1024, it may be reduced to 800×600 or 640×480. Similarly, if the pixel depth is 32 bits per pixel, the system may decrease the pixel depth to 16 or 8 bits per pixel. Likewise, if the refresh rate is 60 Hz, it may be reduced to a value less than 60 Hz such as 50 Hz or 40 Hz. The particular refresh rate value chosen may depend on rates supported by the graphics controller and display hardware. It should be noted that the invention is not limited to any particular decrease in screen resolution, pixel depth, or refresh rate. Further, it should be noted that if the screen resolution or pixel depth is already at a relatively low value then no decrease in the value may be required. Similarly, if the refresh rate was already at a relatively low refresh rate, no decrease in refresh rate may be required.

In embodiments where the operating system is the Microsoft Windows based operating system, the system may execute a "GetSystemPowerStatus" function to determine the current power status of the system, and may use operating system functions to set the resolution.

Further, the system may check to determine if the event is generated because a switch has been made from DC power to AC power, i.e. the system is now connected to an AC power source, and the battery may be recharging (block 310). If so, the system may automatically increase one or more display update properties (block 312). In some embodiments, the system increases the screen resolution (block 314). In alternative embodiments, the system increases the pixel depth (block 316). In further alternative embodiments, the system increases the refresh rate (block 318). The various embodiments of the invention may execute any combination of one or more of blocks 314, 316 or 318. For example, if the screen resolution was set to a relatively low resolution, e.g. 800×600 or 640×480, it may be increased to 1600×1200 or 1280×1024. Similarly, if the pixel depth is set to 16 bits per pixel, the system may increase the pixel depth to 32 bits per pixel. Likewise, if the refresh rate is 40 Hz or 50 Hz, it may be increased to a value of 60 Hz or above. Again, the particular refresh rate value chosen may depend on rates supported by the graphics controller and display hardware. It should be noted that the invention is not limited to any particular increase in screen resolution, pixel depth or refresh rate. Further, it should be noted that if the screen resolution or pixel depth is already at a relatively high value that no increase may be necessary. Similarly, if the refresh rate is already at a relatively high rate, no increase may be necessary.

The system then returns to block 302 to await the next power management event.

FIG. 3B illustrates a method 320 according to various embodiments of the invention for policy based dynamic switching of screen resolution based on power management events. In some embodiments, the method begins when a system executing the method receives a power management event (block 302). In some embodiments, the event may indicate that a change has been made in the power source. For example, the event may indicate that the system is no longer connected to an AC power source, or the event may indicate that the system has been connected to an AC power source. In alternative embodiments, the event may include a battery power level crossing a predetermined threshold indicating the level of charge in the battery. The predetermined threshold may be expressed as a percentage of charge left in the battery, or the threshold may be expressed in terms of time left until the battery is no longer able to provide sufficient power to keep the system running.

Next, the system checks to determine if the power management event matches a predetermined power management policy defining a display update property or properties (i.e. the screen resolution, pixel depth and/or refresh rate) for the event (block 322). The predetermined power management policy may be a default policy, or it may be a policy defined by a user of the mobile computer system.

If there is a power management policy related to a display update property or properties that match the event, then the system sets the display update property or properties as defined by the policy (block 324). Otherwise the system returns to block 302 to wait for the next power management event.

The tasks described with reference to FIGS. 3A and 3B above may be executed by an operating system, by software residing on a graphics controller, software running on a power management controller, or any combination thereof. The embodiments of the invention are not limited to any particular distribution of functionality indicated in the method.

Systems and methods for automatically switching screen resolution upon detecting a power management event have been described. The embodiments of the invention provide advantages over previous systems. For example, the systems and methods of the various embodiments of the invention provide a means for screen resolution, pixel depth and/or video refresh rate to be lowered upon detecting a switch from AC to DC power. The lower screen resolution, pixel depth and/or refresh rate may provide a decrease in power consumption by the system. This in turn may extend the battery life for a mobile computing system. Similarly, upon detecting a switch from DC to AC power, the systems and methods of the various embodiments of the invention may increase display update properties resulting in desirable image quality when the user need not worry about consuming battery power.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method comprising:
   detecting a power management event;
   selecting a policy from a plurality of power management policies, wherein the selected policy matches the power management event; and
   changing a display update property for a video display in response to the power management event, the display update property comprising at least one of a screen resolution or a pixel depth, wherein changing the display update property includes changing the display update property in accordance with the selected policy.

2. The method of claim 1, wherein the detecting the power management event includes detecting a change in a power source from AC power to DC power and wherein changing the display update property includes decreasing the display update property.

3. The method of claim 1, wherein the detecting the power management event includes detecting a change in a power source from DC power to AC power and wherein changing the display update property includes increasing the display update property.

4. The method of claim 1, wherein the detecting the power management event includes detecting a decrease in a power level of a battery past a predetermined threshold and wherein changing the display update property includes decreasing the display update property.

5. The method of claim 1, wherein the detecting the power management event includes detecting an increase in a power level of a battery past a predetermined threshold and wherein changing the display update property includes increasing the display update property.

6. A system comprising:
   a processor;
   a graphics controller coupled to the processor; and
   a frame buffer coupled to the graphics controller, said frame buffer having a size corresponding to a screen resolution and a pixel depth;
   wherein the processor is operable to:
      detect a power management event;
      select a policy from a plurality of power management policies, wherein the selected policy matches the power management event, and
      change the screen resolution in response to the power management event, wherein the processor is operable to change the screen resolution in accordance with the selected policy.

7. The system of claim 6, wherein the power management event includes a change in a power source from AC power to DC power and further wherein the processor is operable to decrease the screen resolution.

8. The system of claim 6, wherein the power management event includes a change in a power source from AC power to DC power and further wherein the processor is operable to decrease the pixel depth.

9. The system of claim 6, wherein the power management event includes a change in a power source from DC power to AC power and wherein the processor is operable to increase the screen resolution.

10. The system of claim 6, wherein the power management event includes a change in a power source from DC power to AC power and further wherein the processor is operable to increase the pixel depth.

11. The system of claim 6, wherein the power management event includes a decrease in a power level of a battery past a predetermined threshold and wherein the processor is operable to decrease the screen resolution.

12. The system of claim 6, wherein the power management event includes an increase in a power level of a battery past a predetermined threshold and wherein the processor is operable to increase the screen resolution.

13. The system of claim 6 further comprising:
    a memory controller; and
    a system memory coupled to the memory controller;
    wherein the frame buffer resides in the system memory.

14. The system of claim 13, wherein the graphics controller and the memory controller are integrated into a single chipset.

15. A machine-readable medium having machine executable instructions for performing a method comprising:
    detecting a power management event;
    selecting a policy from a plurality of power management policies, wherein the selected policy matches the power management event; and
    changing a display update property for a video display in response to the power management event, the display update property comprising at least one of a screen resolution or a pixel depth, wherein changing the display update property includes changing the display update property in accordance with the selected policy.

16. The machine readable medium of claim 15, wherein the detecting the power management event includes detecting a change in a power source from AC power to DC power and wherein changing the display update property includes decreasing the display update property.

17. The machine readable medium of claim 15, wherein the detecting the power management event includes detecting a change in a power source from DC power to AC power and wherein changing the display update property includes increasing the display update property.

18. The machine readable medium of claim 15, wherein the detecting the power management event includes detecting a decrease in a power level of a battery past a predetermined threshold and wherein changing the display update property includes decreasing the display update property.

19. The machine readable medium of claim 15, wherein the detecting the power management event includes detecting an increase in a power level of a battery past a predetermined threshold and wherein changing the display update property includes increasing the display update property.

* * * * *